Dec. 12, 1961 CHOKU TAKAHASHI 3,013,115

PICTURE TRANSMISSION

Filed Dec. 16, 1958

2 Sheets-Sheet 1

Inventor
C. TAKAHASHI
By R P Morris
Attorney

Inventor
C. TAKAHASHI
By R. P. Morris
Attorney

United States Patent Office 3,013,115

Patented Dec. 12, 1961

3,013,115

PICTURE TRANSMISSION

Choku Takahashi, Tokyo, Japan, assignor to Nippon Electric Company, Limited, Tokyo, Japan, a corporation of Japan Filed Dec. 16, 1958, Ser. No. 780,890
Claims priority, application Japan Dec. 26, 1957
4 Claims. (Cl. 178—7.1)

This invention relates to picture transmission such as by facsimile methods and in particular to the development by photo-electric conversion processes of a video signal from which the direct current component has been removed.

There are various methods of performing photo-electric conversion in a picture transmission system. In one method a light interrupter, such as a chopper, interrupts a light beam either as it is projected to, or reflected from, a picture on its path to a photo electric cell. The output from the cell includes both the fundamental wave produced by the chopper and the wave representing the brightness variations in the light and dark areas of the picture. It is an object of this invention to remove this undesired fundamental wave.

Various methods have been proposed for eliminating the fundemental wave such as by filtering, rectifying and remodulating or by combining two interrupted frequencies, one from the reflected light of a picture and the other directly from the light source by making use of two photo electric cells. In the first method there were difficulties resulting from wave-form distortions due to filtering and to distortion in remodulation, while in the latter method there were difficulties in adjusting the output levels from the two photo electric cells.

This invention avoids these difficulties by obtaining in-phase signals and opposite phase signals from the output of a photo electric converter. The fundamental wave which is also present as a result of the conversion is eliminated by keying both signals with a wave having twice the period of the intermittent period of the chopper.

Figure 1:
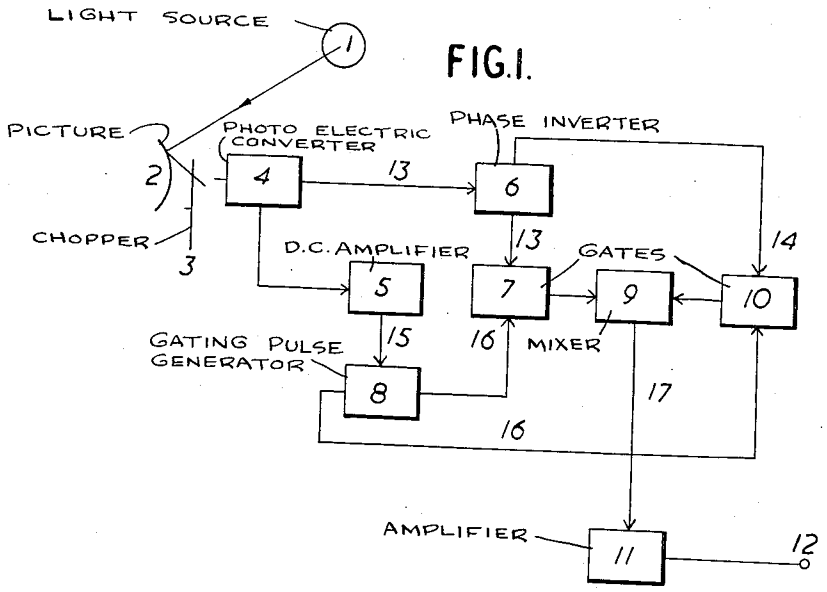
Figure 4:
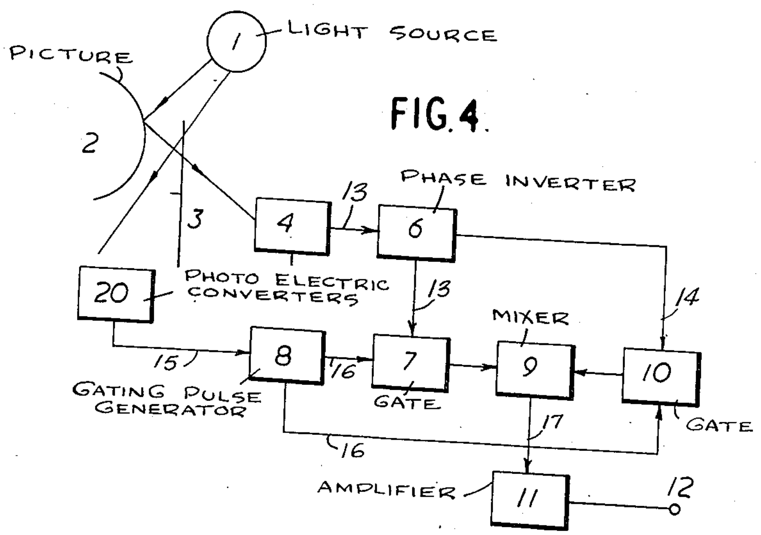
Figure 2:
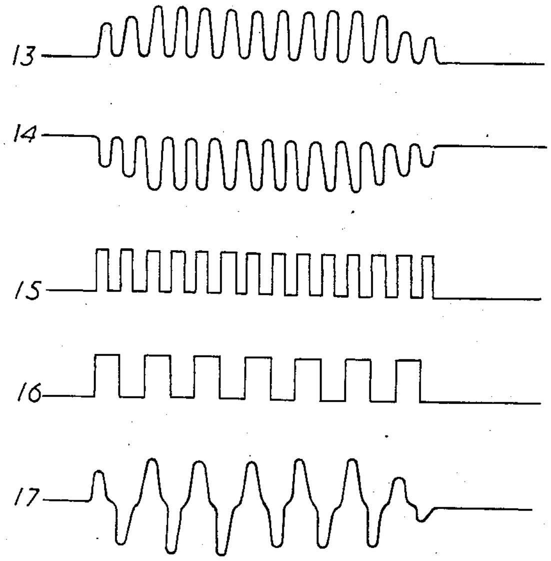
Figure 3:
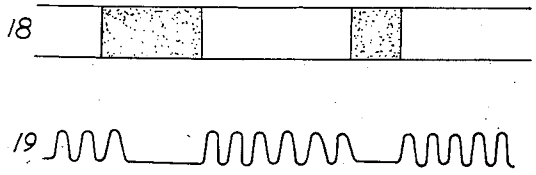

The above-mentioned and other features and objects of this invention will become apparent by reference to the following description taken in conjunction with the accompanying drawings, in which:

FIG. 1 shows the schematic diagram of one circuit employing the invention, FIGS. 2 and 3 are wave-form diagrams for explaining the operation of FIG. 1, and FIG. 4 is a schematic diagram of another circuit employing this invention.

The reference numerals indicating the connecting leads between the various circuit components shown in FIGS. 1 and 4 correspond to the numerals indicating the wave-form of the currents in the corresponding leads as indicated in FIG. 2.

Referring to FIG. 1, 1 shows a light source; 2, a picture to be transmitted; 3, a chopper having an intermittent period equivalent to one-half the period of the most suitable carrier wave determined by the best picture signal frequency and transmitting band width; 4, a photo electric converter; 5, a direct current amplifier; 6, a phase inverter for producing in-phase signals and opposite phase signals; 7 and 10, gate circuits; 8, a gating pulse generator having a pulse period of twice the period of the chopper intermittent period; 9, a mixer; 11, a transmitting amplifier; and 12, the output terminal.

The reflected light of picture 2, illuminated by electric source 1, is interrupted by chopper 3 and applied to the photo electric converter 4. In FIG. 3 wave-forms 18 and 19 respectively show the picture analyzed as to line elements and as to the electric output corresponding to light and dark areas of the picture. In FIG. 2, wave-form 13 is an enlargement of wave-form 19. The wave-form 13 corresponds to the light part of picture.

The output from the converter 4 (wave-form 13) is applied to the phase inverter 6. The phase inverter produces two voltage outputs, one in phase with the input and the other of opposite phase (wave-form 14). The in-phase voltage is applied to gate circuit 7 and the voltage of opposite phase is applied to the gate circuit 10.

The output from the photo-electric converter is also applied to the D.-C. amplifier 5 from which an output voltage of wave-form 15 is obtained. The voltage wave 15 is applied to the gate pulse generator 8. This generator produces an output pulse of twice the period of the input pulse as shown by the wave-form 16.

In gating circuits 7 and 10 alternately the voltage pulse of wave-form 16 gates the in-phase and the opposite-phase voltage inputs from the phase inverter 6. The outputs of gates 7 and 10 are combined in the mixer 9 to produce in the output thereof the voltage of wave form 17 from which the D.-C. component has been removed.

The operation of the circuit of FIG. 4 differs from that of FIG. 1 in the following respect. The D.-C. amplifier 5 of FIG. 1 has been removed and the voltage wave 15 used to produce the gating pulse 16 in the gating pulse generator 8 is obtained directly from the photo-electric converter 20. The chopper 3 interrupts an unmodulated light beam from the light source 1 coincidently with the interruption of the modulated light beam reflected from the picture 2. The arrangement of FIG. 4 is believed to be more simple than that of FIG. 1.

From the above description of the invention it will be seen that the D.-C. component of the picture signal is easily removed from the combined D.-C. and modulated components resulting from the chopping of the light beam and photo-electric conversion.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Apparatus for producing a video signal from a picture to be transmitted comprising a light source, means for converting light energy into pulses of electrical energy, means for directing a light beam from said source to said converting means via said picture, chopper means positioned in the path of said beam to interrupt said beam to produce in said converting means current pulses representing picture elements which include the direct current and alternating current components, means connected to said converting means for producing from said current pulses pulses of opposite phase, means for producing a pulse train of pulses having a period twice the period of interruption of said beam and means for combining said pulses of opposite phase with the pulses of said pulse train to remove said direct current component.

2. Apparatus for producing a video signal in accordance with claim 1 further comprising a direct current amplifier connected between said converter means and said means for producing a pulse train of pulses having a period twice the period of interruption of said beam, said amplifier producing a substantially square wave pulse train having the same period as the period of interruption of said beam.

3. Apparatus for producing a video signal comprising a light source, means for directing a light beam from said source onto a picture to be transmitted to obtain a reflected beam, chopper means positioned in the path of said light beam for interrupting said beam to form an interrupted beam representing picture elements which include the direct current and alternating components of the picture, means for converting the interrupted beam into electric pulses of opposite phase, means for producing a pulse train of pulses having a period twice the period of interruption of said beam and means for combining said two opposite phased pulses with the pulses of said pulse train to remove said direct current component.

4. Apparatus for producing a video signal in accordance with claim 3 in which said means for producing a pulse train of pulses having a period twice the period of interruption of said beam further comprises means for interrupting a second beam from said light source simultaneously with the interruption of said reflected beam to produce a second interrupted beam, a second converting means for converting the second interrupted beam into a train of electric pulses.

References Cited in the file of this patent

UNITED STATES PATENTS

| | | |
|---|---|---|
| 2,103,793 | Philpott | Dec. 28, 1937 |
| 2,336,673 | Cooley | Dec. 14, 1943 |
| 2,657,258 | Hester | Oct. 27, 1953 |